US011000774B2

(12) United States Patent
Bishop et al.

(10) Patent No.: US 11,000,774 B2
(45) Date of Patent: May 11, 2021

(54) TEAR RESISTANT BALLOONS

(71) Applicant: SEATRIEVER INTERNATIONAL HOLDINGS LIMITED, Northwich (GB)

(72) Inventors: James Bishop, Northwich (GB); Tony Rhoades, Northwich (GB)

(73) Assignee: Seatriever International Holdings Limited, Northwich (GB)

( * ) Notice: Subject to any disclaimer, the term of this patent is extended or adjusted under 35 U.S.C. 154(b) by 0 days.

(21) Appl. No.: 14/439,947

(22) PCT Filed: Oct. 30, 2013

(86) PCT No.: PCT/GB2013/052833
§ 371 (c)(1),
(2) Date: Apr. 30, 2015

(87) PCT Pub. No.: WO2014/068311
PCT Pub. Date: May 8, 2014

(65) Prior Publication Data
US 2015/0273350 A1 Oct. 1, 2015

(30) Foreign Application Priority Data
Oct. 30, 2012 (GB) .................................... 1219558

(51) Int. Cl.
*A63H 27/10* (2006.01)
*B29C 41/14* (2006.01)
(Continued)

(52) U.S. Cl.
CPC ............. *A63H 27/10* (2013.01); *B29C 41/14* (2013.01); *B29C 41/38* (2013.01); *B29C 41/46* (2013.01);
(Continued)

(58) Field of Classification Search
CPC ............ A63H 27/10; A63H 2027/1025; A63H 2027/1075; B29C 41/14; B29C 41/38; B29C 41/46
See application file for complete search history.

(56) References Cited

U.S. PATENT DOCUMENTS 2,027,225 A * 1/1936 Gill .......................... A63H 3/06
446/226
2,041,737 A * 5/1936 Beal ....................... A63H 27/10
446/220
(Continued)

FOREIGN PATENT DOCUMENTS

GB 846976 9/1960
JP 3096733 U 10/2003
(Continued)

OTHER PUBLICATIONS

International Search Report and Written Opinion for PCT/GB2013/052833.
GB Search Report, GB1219558.2.

*Primary Examiner* — Eugene L Kim
*Assistant Examiner* — Alyssa M Hylinski
(74) *Attorney, Agent, or Firm* — Quarles & Brady LLP

(57) ABSTRACT

A balloon (10) extending generally axially from an opening (14) at a first end. The balloon comprises an elastomeric film (11) having a first thickness and a plurality of intersecting ribs (12) of a second, greater thickness formed on the film. The ribs are adapted so as to be angled with respect to the axis (13) of the balloon and any axis perpendicular thereto. Such a balloon has increased tear resistance, and can be manufactured with conventional dipping techniques without compromising the integrity of the film. The ribs may comprise a plurality of helices. There is also a former for making such a balloon and a method of using such a former to make such a balloon.

21 Claims, 5 Drawing Sheets

(51) Int. Cl.
  *B29C 41/38* (2006.01)
  *B29C 41/46* (2006.01)
  *B29K 7/00* (2006.01)
  *B29L 22/02* (2006.01)

(52) U.S. Cl.
  CPC ............... *A63H 2027/1025* (2013.01); *A63H 2027/1075* (2013.01); *B29K 2007/00* (2013.01); *B29L 2022/022* (2013.01); *Y10T 29/49826* (2015.01); *Y10T 29/49947* (2015.01)

(56) References Cited

U.S. PATENT DOCUMENTS

| | | | | |
|---|---|---|---|---|
| 2,119,498 A * | 5/1938 | Spanel | ...................... | A42B 1/12 2/68 |
| 2,193,069 A * | 3/1940 | Krueger | ................. | A63H 27/10 446/226 |
| D159,718 S * | 8/1950 | Daniel et al. | ................ | D21/440 |
| 2,635,358 A | 4/1953 | Carl | | |
| 4,103,439 A * | 8/1978 | Abramson | ............... | A43B 1/10 36/7.3 |
| 4,292,999 A * | 10/1981 | Szollmann | .............. | F16K 15/20 116/210 |
| 4,315,963 A * | 2/1982 | Havens | .................. | B29C 48/10 428/35.2 |
| 4,881,553 A | 11/1989 | Grossman | | |
| 5,075,144 A | 12/1991 | Kakuwa | | |
| 5,356,327 A * | 10/1994 | Gill | ........................ | A63H 27/10 249/60 |
| 5,383,806 A * | 1/1995 | Prater | .................... | A63H 27/10 427/393.5 |
| 6,321,751 B1 * | 11/2001 | Strauss | ..................... | A61F 6/04 128/844 |
| 6,936,314 B1 * | 8/2005 | Schultz | .................. | A41G 1/007 428/18 |
| D563,492 S * | 3/2008 | Becker | ......................... | D21/398 |
| 9,186,594 B2 * | 11/2015 | Halliburton | ............... | B64B 1/40 |
| 9,316,364 B2 * | 4/2016 | Halliburton | ............ | A63H 27/10 |
| 2001/0023696 A1 | 9/2001 | Strauss | | |
| 2001/0035634 A1 * | 11/2001 | Breed | .................... | B60R 21/20 280/730.2 |
| 2004/0116039 A1 * | 6/2004 | Mueller | ................. | A63H 27/10 446/220 |
| 2006/0039138 A1 * | 2/2006 | Oxborrow | .............. | A63H 27/10 362/189 |
| 2006/0041991 A1 | 3/2006 | Kim Sim | | |
| 2009/0139010 A1 | 6/2009 | Bevier | | |

FOREIGN PATENT DOCUMENTS

JP  2008-284012 A  11/2008
KR  20020071815  9/2002

* cited by examiner

TEAR RESISTANT BALLOONS

The present invention relates to balloons. In particular, the present invention relates to tear resistant elastomeric formed balloons.

BACKGROUND TO THE INVENTION

Many balloons are manufactured from elastomeric material. They are typically formed by dipping a generally axial former into a liquid compound. The liquid compound clings to the former and can then be cured and subsequently peeled away from the former. This thereby provides a balloon having a desired shape. As the balloon is formed from elastomeric material it is capable of stretching in use to enable inflation.

As an artefact of the dipping process, the balloon extends generally axially from an opening at a first end. The dipping process also limits the complexity of shapes that can be formed. In particular, formations perpendicular to the axis of the former tool can provide places where air bubbles form or contaminants gather affecting the integrity of the film formed on the mould. Such bubbles or contaminants can weaken the film or reduce its elastic properties.

A problem common to such balloons is the fact that if an elastomeric film is stretched beyond a particular limit, for instance by becoming caught by a sharp edge, a tear can form which will propagate rapidly across the parts of the film under tension. On many occasions the tear will propagate sufficiently far and fast to substantially destroy the balloon. This effect occurs in an inflated balloon when the tear typically propagates at a rate of the order of the speed of sound, resulting in the familiar 'bang' sound when a balloon is burst. This 'bang' can be loud enough to frighten nearby persons. Also, as a result of the speed of propagation of the tear and subsequent recoil of the opposing edges the balloon can be propelled some distance upon bursting. The propelled balloon fragments following bursting could cause minor injuries if they were to hit the eye or facial area of a nearby person. Additionally, in recent years balloons have been developed incorporating internal illumination means such as those described in WO2008/110832. If such balloons should burst, the illumination means can be propelled at a significant velocity and thus may pose an injury risk to nearby persons. Another problem associated with such balloons is that when a balloon bursts, it can burst into several fragments of varying sizes and these can pose a suffocation risk to children if they attempt to eat them.

It is therefore an object of the present invention to provide a balloon which at least partially overcomes or alleviates the above problems.

SUMMARY OF THE INVENTION

According to a first aspect of the present invention there is provided a balloon extending generally axially from an opening at a first end, the balloon comprising: an elastomeric film having a first thickness; and a plurality of intersecting ribs of a second, greater thickness formed on the film, wherein the ribs are adapted so as to be angled with respect to the axis of the balloon and any axis perpendicular thereto.

This thereby provides an elastomeric balloon with improved strength and tear resistance. In testing, when compared with an equivalent non-ribbed balloon inflated to the same size, a balloon according to the present invention inflated to 9 inches and then burst, takes on average 2.3 times longer to experience a tear the full length of the balloon, i.e. the tear propagation speed is reduced meaning the likelihood of it causing minor injuries is reduced. It also results in a lower noise level on bursting than that of equivalent non-ribbed balloons, reducing the likelihood of scaring nearby persons as well as a reduction on fragmentation meaning the risk of suffocation for children is similarly reduced.

This thereby further provides that such a balloon can be manufactured with conventional dipping techniques without compromising the integrity of the film. When ribs are formed on the film at an angle to the axis of the balloon and any axis perpendicular to it, as opposed to parallel and perpendicular to the axis, this reduces the likelihood of trapping air bubbles or other contaminants in the ribs of the balloon during the dipping process. As such, balloons are formed without voids or discontinuities.

The intersecting ribs may be elongate. Preferably, the ribs have a substantially constant profile along their length. Preferably each rib has substantially the same profile. Most preferably, the profile is curved. In such instances, the curved profile may comprise an arc of a circle or ellipse.

In some embodiments different ribs may be adapted to have different thicknesses. Preferably in such embodiments, ribs have two different thicknesses. Preferably, in such embodiments alternate ribs are of each different thickness.

At intersection points, the profile of each rib may remain substantially identical. Alternatively, at intersection points, the profile of each rib may vary. This variation may include smoothing of edges or vertices between ribs.

The ribs may be aligned at and/or intersect at any desired angle. Preferably, the ribs are aligned at angles to the balloon axis of, say, between 5° and 85°.

The ribs may comprise any particular pattern. Preferably, the ribs comprise a plurality of helices. Having a plurality of helical shaped ribs further reduces the tear propagation time and further reduces the likelihood of trapping air bubbles or other contaminants in the ribs during the dipping process. Most preferably, the ribs comprise equal numbers of oppositely pitched helices.

In a preferred embodiment, the helices each originate at a cap. The cap may be provided at the distal end of the balloon. The cap may comprise an area of thickness substantially equal to the rib thickness. In the event that the balloon has multiple distal ends, a cap may be provided at each distal end.

Preferably, the ribs are adapted such that each rib ends at an intersection with another rib. In the above embodiments, this may be achieved by having oppositely directed helices meet at their ends.

Preferably, the ribs are formed on the internal surface of the balloon such that it would not necessarily be discernible to consumers that the balloon had ribs on the internal surface. The ribs would thereby not spoil the aesthetic appeal of the balloon.

The balloon may be provided with an illumination device mounted inside. In such a balloon, the illumination device may comprise a light emitting diode (LED) and may be powered by at least one battery. The illumination device may have a projection whereby it is attached to the elastomeric film, inside the balloon, by a clip, band or O-ring fitted onto the projection from outside the balloon. A strip of insulating material may be initially located between the battery or batteries and the LED, the strip being capable of being withdrawn, prior to or upon inflation of the balloon, to light up the LED and the balloon.

According to a second aspect of the present invention there is provided a former for making a balloon from elastomeric material comprising: a body portion extending generally axially from a base and conforming to the shape of the balloon to be formed; and a plurality of intersecting grooves provided on said body portion wherein the grooves are adapted so as to be angled with respect to the axis of the body and any axis perpendicular thereto.

This thereby provides a former for making an elastomeric balloon with improved strength and tear resistance. It further enables such a balloon to be manufactured with conventional dipping techniques without compromising the integrity of the film.

The intersecting grooves may be elongate. Preferably, the grooves have a substantially constant profile along their length. Preferably each groove has substantially the same profile. Most preferably, the profile is curved. In such instances, the curved profile may comprise an arc of a circle or ellipse.

In some embodiments different grooves may be adapted to have different depths. Preferably in such embodiments, grooves have two different depths. Preferably, in such embodiments alternate grooves are of each different depth.

At intersection points, the profile of each groove may remain substantially identical. Alternatively, at intersection points, the profile of each groove may vary. This variation may include smoothing of edges or vertices between grooves.

The grooves may be aligned at and/or intersect at any desired angle. Preferably, the grooves are aligned at angles to the article axis of, say, between 5° and 85°.

The grooves may comprise any particular pattern. Preferably, the grooves comprise a plurality of helices. Most preferably, the grooves comprise equal numbers of oppositely pitched helices.

In a preferred embodiment, the helices each originate at a cap. The cap may be provided at the distal end of the former. The cap may comprise an area of depth substantially equal to the groove depth. In the event that the former has multiple distal ends, a cap may be provided at each distal end.

Preferably, the grooves are adapted such that each groove ends at an intersection with another groove. In the above embodiments, this may be achieved by having oppositely directed helices meet at their ends.

The former may be formed from any suitable substance. In particular, the former may be formed from metal, plastic or ceramic material as desired or required.

According to a third aspect of the present invention there is provided a method of making a balloon according to the first aspect of the present invention using a former according to the second aspect of the present invention, the method comprising the steps of: providing a former according to the second aspect of the second invention; introducing said former into a suitable container of liquid elastomeric material in a direction substantially parallel to the axis of the body; removing the former from the container of liquid elastomeric material in a direction substantially parallel to the axis of the body; curing the elastomeric material; and removing the cured elastomeric material from the former.

The method of the third aspect of the present invention may incorporate any or all of the features of the first and second aspects of the present invention as desired or as appropriate.

Curing may be achieved by exposure to radiation, heat or the atmosphere. The elastomeric material may comprise latex.

DETAILED DESCRIPTION OF THE INVENTION

In order that the present invention may be more clearly understood, a specific embodiment will now be described, with reference to the accompanying drawings, in which.

Figure 1:
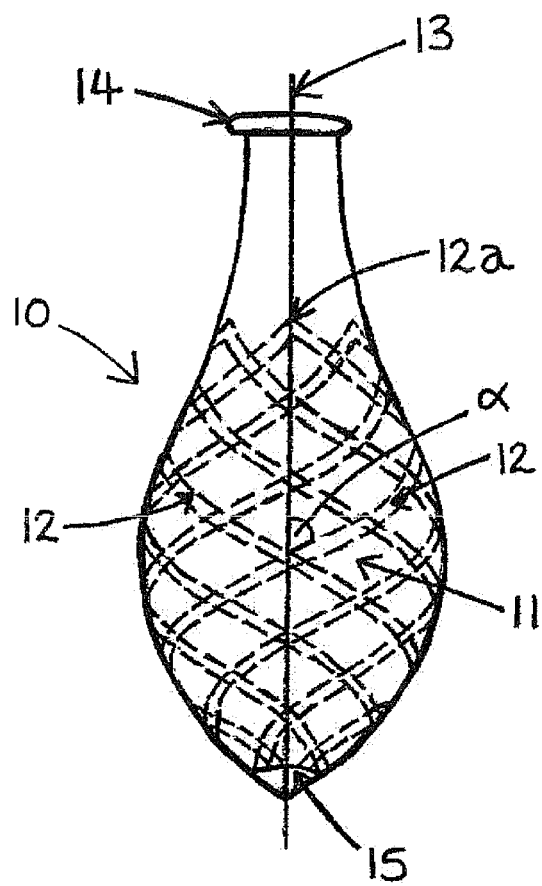
FIG. 1 is a schematic illustration of a balloon according to the present invention.

Turning now to FIG. 1, a tear resistant balloon 10 is shown. The balloon 10 is formed from an elastomeric film of a first thickness and a plurality of intersecting ribs 12 of a second, greater thickness formed on the film 11 and formed of the same material. Typically, the balloon is formed from a suitable elastomeric material such as latex.

The balloon 10 extends generally axially about axis 13 from an opening 14 to an end cap or root 15 which is also of the greater thickness. The ribs 12 are angled with respect to the axis 13 and any axis perpendicular thereto. Angling the ribs 12 in such a manner allows the balloon 10 to be manufactured with conventional dip forming techniques without compromising the integrity of the balloon 10 generally or the ribs 12 particularly. Typically, the angle between the ribs 12 and the axis 13, α, falls in the range 5°-85°.

Figure 1A:
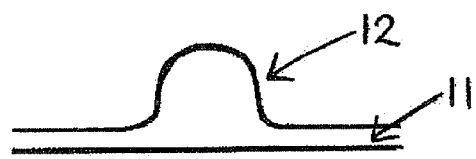
FIG. 1a is an expanded cross section of a rib of the balloon of FIG. 1, showing the profile of a rib.

The ribs 12 are elongate with a substantially constant profile along their length. As is shown in the expanded cross-section of FIG. 1a, the profile has a curved form. In the example shown, the ribs 12 comprise equal numbers of oppositely pitched helices originating at cap 15. Each rib 12 ends at the meeting point 12a with another rib 12 adjacent to the opening 14.

In use, air can be introduced to the balloon 10 through the opening 14 to inflate the balloon. As a result of the introduced air, the air pressure inside the balloon 10 increases and the elastomeric film 11 expands in response to the increased pressure. When sufficient air has been introduced, the opening 14 can be sealed, typically by tying a knot.

If the balloon does tear, the tear will be limited to one single rhomboid shaped tear, a rhomboid shape as defined by adjacent ribs, leaving the remaining structure of the balloon intact rather than potentially having two or more fragments. Since the likelihood of fragments forming on bursting is significantly reduced, the likelihood of projectile hazards is significantly reduced and consequently the risk of damage. Additionally, fewer fragments forming on bursting significantly reduces the risk of suffocation on broken balloons.

If the inflated balloon 10 is subject to a piercing impact (or indeed, if the pressure within the inflated balloon 10 exceeds a particular level) a tear can form in the thinner film 11. In a conventional balloon, this tear would rapidly propagate across the film, with a maximum speed of a few hundred meters/second. In the present balloon 10, any tear propagates freely only as far as the nearest rib 12. Having hit the rib 12, as the rib 12 is thicker (and hence stronger) than the film 11, the tear slows and then is diverted and propagates alongside the rib 12. When the tear reaches an intersection between two ribs 12, the stress is concentrated at the intersection. As such, the crack is able to propagate across the intersection. However, since the intersection is much thicker than the bulk film 11, this propagation is much slower than the earlier propagation of the tear and absorbs a much larger proportion of the energy powering the propagation than would be the case for a tear travelling an equivalent distance across the film 11.

After propagating across an intersection, the tear will continue to propagate across the film 11 until it reaches another intersection. As a result of the slowing by the first intersection, the tear will propagate across this film with a reduced speed. Upon reaching another intersection, the propagation speed of the tear will once again be reduced as the tear crosses the intersection.

As such, whilst a balloon 10 according to the present invention will still be destroyed by a penetrating impact when inflated, the propagation speed of the tear is significantly reduced. This has the consequence of reducing the recoil speed of the balloon 10 (or balloon fragments) after propagation of the crack is completed. As such, the likelihood of injury or damage being caused by the balloon 10 (or balloon fragments) is reduced.

In view of the above, the balloon 10 of the present invention is particularly well suited to being provided with an illumination device mounted therein (not shown). The illumination device may comprise a light emitting diode (LED) powered by at least one battery. The illumination device typically has a projection whereby it is attached to the elastomeric film 11 (or end cap 15), inside the balloon 10, by a clip or O-ring fitted onto the projection from outside the balloon 10. In a preferred version of such a balloon, a strip of insulating material is initially located between the battery or batteries and the LED, the strip being capable of being withdrawn, prior to or upon inflation of the balloon, to light up the LED and the balloon. Typically, the strip extends through the opening 14 to an outer end region of enlarged width. The strip may also have a second region of enlarged width at a spacing from the enlarged outer end region, the width of said second region being chosen so that it tends to remain inside the opening 14 of the balloon 10, with the rim of the balloon membrane lodged between the respective enlarged width regions, unless a significant force is used to pull the strip outwardly of the balloon 10.

If a balloon does tear as described above to form a rhomboid shaped tear and leaving the rest of the balloon intact, and the balloon contains an illumination device, the illumination device will remain within the balloon, reducing the risk of a projectile hazard.

Figure 2:
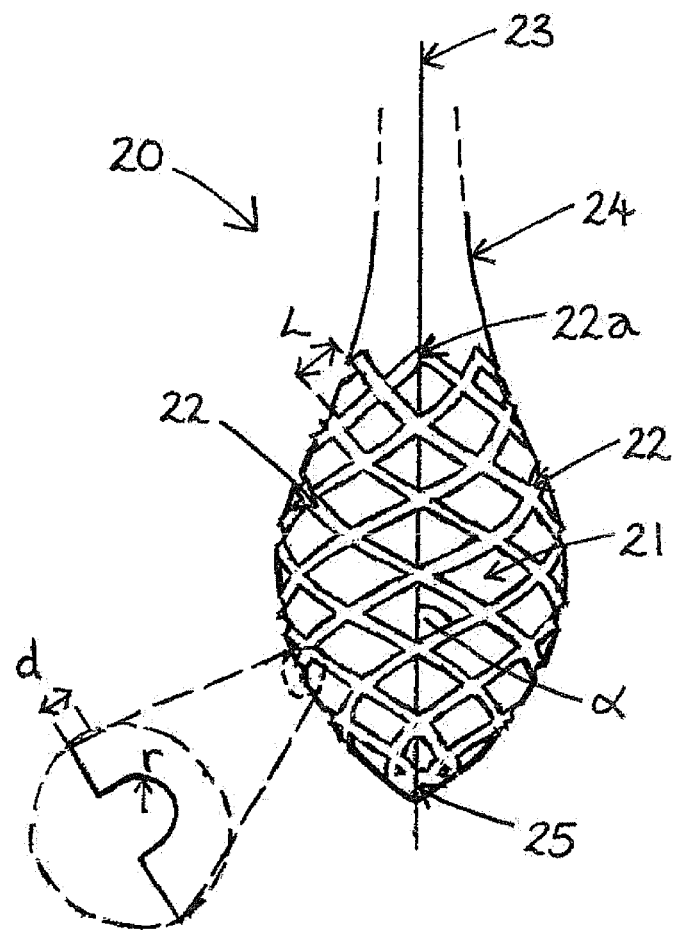
FIG. 2 is a schematic illustration of a former for making a balloon according to the present invention.
Figure 3:
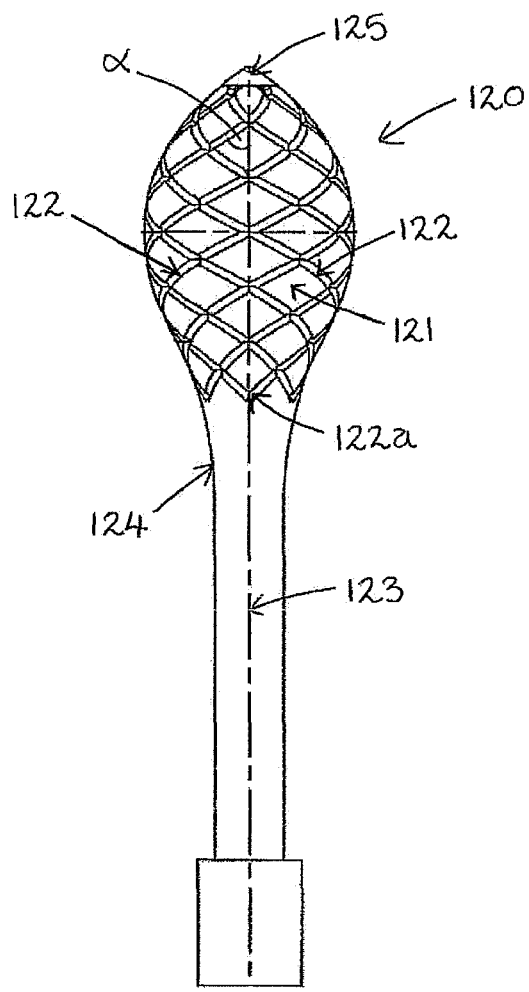
FIG. 3 is a schematic illustration of another embodiment of a former for making a balloon according to the present invention.
Figure 3A:
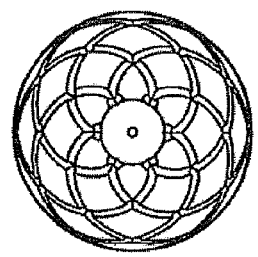
FIG. 3a is an end view of the embodiment of FIG. 3.
Figure 4:
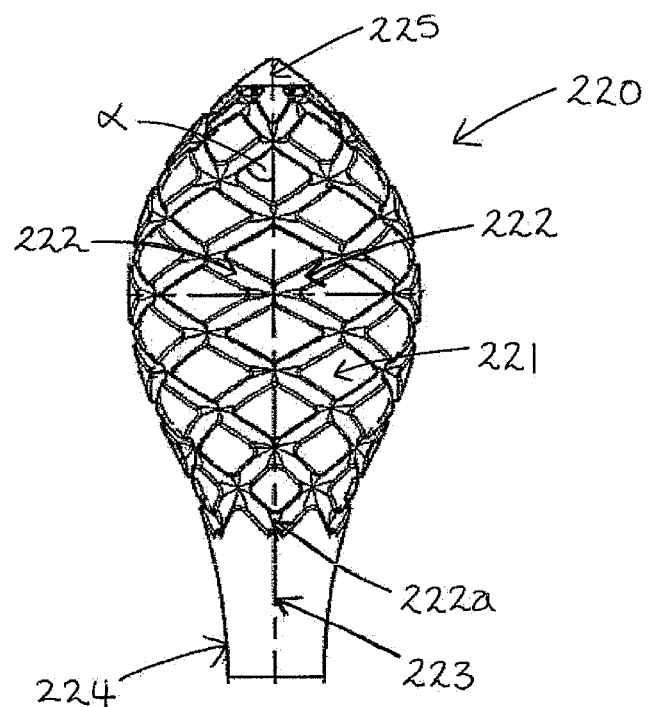
FIG. 4 is a schematic illustration of another embodiment of a former for making a balloon according to the present invention.
Figure 4A:
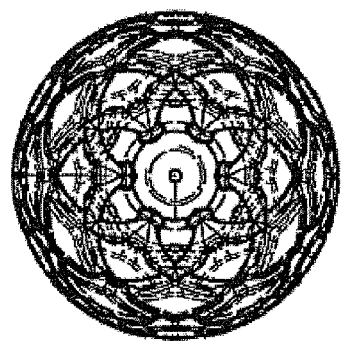
FIG. 4a is an end view of the embodiment of FIG. 4.
Figure 5:
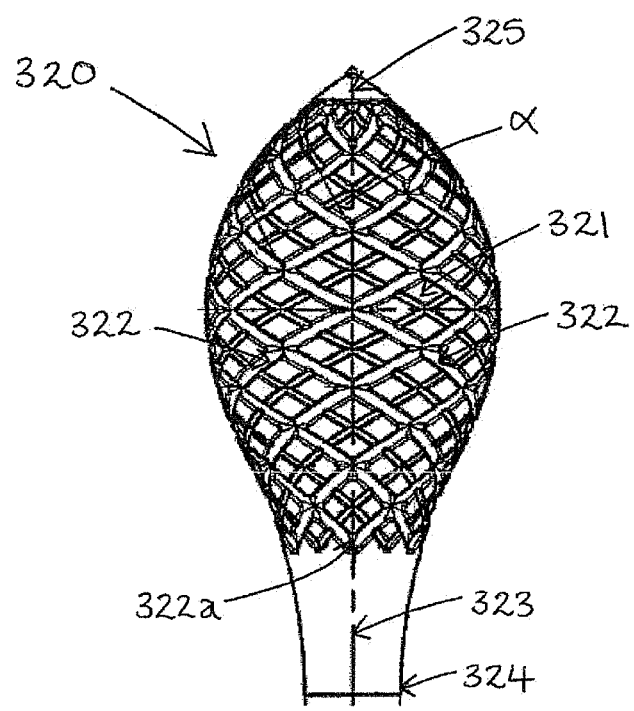
FIG. 5 is a schematic illustration of another embodiment of a former for making a balloon according to the present invention.
Figure 5A:
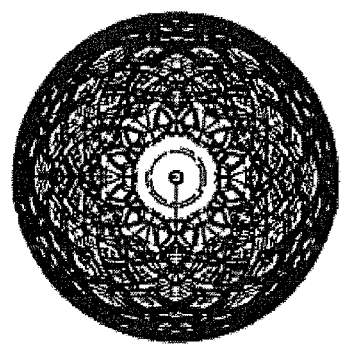
FIG. 5a is an end view of the embodiment of FIG. 5.

Turning now to FIG. 2, a former 20 for making a balloon 10 is shown. The former comprises a bulb 21 with a substantially smooth curved bulk surface and a plurality of grooves 22. The bulb 21 extends axially about and axis 23 from a shaft 24 to an end 25.

The grooves 22 are angled with respect to the axis 23 and any axis perpendicular thereto. Typically, the angle between the grooves 22 and the axis 23, α, falls in the range 5°-85°.

The grooves 22 are elongate with a substantially constant profile along their length. As is shown in the expanded cross-section of FIG. 2a, the profile has a curved form. In particular, the grooves 12 may be defined by a depth d and radius r, as shown in FIG. 2a. In a typical example, the depth d may be in the range 0-3 mm and the radius r may be in the range 0.1-2.5 mm.

In the example shown, the grooves 22 comprise equal numbers of oppositely pitched helices originating at end 25. Each groove 22 ends at the meeting point 22a with another groove 22 adjacent to the shaft 24. For a typical balloon former of length in the range 50-100 mm and maximum diameter in the range 50-100 mm There may be between 2 and 24 helical grooves 12. In a typical example the separation L of successive grooves 12 may be in the region of 5-20 mm.

In order to use the former 20 to manufacture a balloon 10, the former is introduced into a suitable container of liquid elastomeric material in a direction substantially parallel to the axis 23. Subsequently, the former 20 is removed from the container of liquid elastomeric material in a direction substantially parallel to the axis 23. This results in a film of liquid elastomeric material clinging to the surface of the former 20 in particular the bulk surface of the bulb 21 and filling the grooves 22. The elastomeric material is subsequently cured and thereby forms a solid film 11 over the bulk surface of the bulb 21 with a plurality of ribs 12 corresponding to the grooves 22. The cured elastomeric material can then be removed from the former 20 to provide a balloon 10 according to the present invention. As a consequence of the angling of the grooves 22, air bubbles or contaminants do not become trapped in the grooves 22 when the former is introduced to the liquid elastomeric material. As such, the ribs 12 of the balloon 10 can be formed without voids or discontinuities, improving their structural integrity.

It is of course to be understood that the invention is not to be restricted to the details of the above embodiment, which is described by way of example only.

The invention claimed is:

1. A seamless balloon extending generally axially from an opening at a first end, the balloon comprising: a seamless elastomeric film having a first thickness; and being adapted to limit the propagation speed of tears in the film when the balloon is inflated by the provision of a plurality of intersecting ribs of a second, greater thickness formed on the film, wherein the ribs are disposed at an angle that is not parallel or perpendicular to the longitudinal axis of the balloon and wherein an illumination device is mounted inside the balloon.

2. The balloon as claimed in claim 1 wherein the intersecting ribs are elongate.

3. The balloon as claimed in claim 1 wherein the ribs have a substantially constant profile along their length.

4. The as claimed in claim 3 wherein each rib has substantially the same profile.

5. The balloon as claimed in claim 3 wherein the profile is curved.

6. The balloon as claimed in claim 1 wherein different ribs are adapted to have different thicknesses.

7. The balloon as claimed in claim 6 wherein ribs have two different thicknesses and wherein alternate ribs are of each different thickness.

8. The balloon as claimed in claim 1 wherein at intersection points, the profile of each rib remains substantially identical.

9. The balloon as claimed in claim 1 wherein a profile of each rib includes smoothing of edges or vertices between ribs.

10. The balloon as claimed in claim 1 wherein the ribs are aligned at angles to a longitudinal axis of the balloon of between 5° and 85°.

11. The balloon as claimed in claim 1 wherein the ribs comprise a plurality of helices.

12. The balloon as claimed in claim 11 wherein the ribs comprise equal numbers of oppositely pitched helices.

13. The balloon as claimed in claim 11 wherein the helices each originate at a cap provided at the distal end of the balloon.

14. The A balloon as claimed in claim 13 wherein in the event that the balloon has multiple distal ends, a cap is provided at each distal end.

15. The balloon as claimed in claim 12 wherein the ribs are adapted such that each rib ends at an intersection with another rib.

16. The balloon as claimed in claim 1 wherein the balloon is tear resistant.

17. The balloon as claimed in claim 1 wherein the balloon is dipped.

18. A method of making a seamless balloon extending generally axially from an opening at a first end, the balloon comprising: a seamless elastomeric film having a first thickness, and adapted to limit the propagation speed of tears in the film when the balloon is inflated by the provision of a plurality of intersecting ribs of a second, greater thickness formed on the film, wherein the ribs are disposed at an angle that is not parallel or perpendicular to a longitudinal axis of the balloon, the method comprising the steps of:

providing a former having a substantially smooth body portion extending generally axially from a base and conforming to the shape of the balloon to be formed; and a plurality of intersecting grooves provided on said body portion wherein the grooves are disposed at an angle that is not parallel or perpendicular to a longitudinal axis of the body portion;

introducing said former into a suitable container of liquid elastomeric material in a direction parallel to the longitudinal axis of the body portion;

removing the former from the container of liquid elastomeric material in a direction parallel to the longitudinal axis of the body portion;

curing the elastomeric material;

removing the cured elastomeric material from the former; and mounting an illumination device inside the balloon.

19. The method as claimed in claim 18 wherein curing is achieved by exposure to radiation, heat or the atmosphere.

20. The method as claimed in claim 18 wherein the elastomeric material comprises latex.

21. The method as claimed in claim 18 wherein the mounting step involves attaching a projection of the illumination device to the elastomeric film, inside the balloon, by a clip, band, or O-ring fitted onto the projection from outside the balloon.

* * * * *